United States Patent
Derckx et al.

(10) Patent No.: US 11,961,321 B2
(45) Date of Patent: Apr. 16, 2024

(54) BIOMETRIC SKIN CONTACT SENSOR AND METHOD OF OPERATING A BIOMETRIC SKIN CONTACT SENSOR

(71) Applicant: TOUCH BIOMETRIX LIMITED, St Asaph (GB)

(72) Inventors: Henricus Derckx, St Asaph (GB); Wilhelmus Van Lier, St Asaph (GB); Toru Sakai, St Asaph (GB)

(73) Assignee: TOUCH BIOMETRIX LIMITED, St. Asaph (GB)

( * ) Notice: Subject to any disclaimer, the term of this patent is extended or adjusted under 35 U.S.C. 154(b) by 0 days.

(21) Appl. No.: 18/023,543

(22) PCT Filed: Aug. 27, 2021

(86) PCT No.: PCT/GB2021/052226
§ 371 (c)(1),
(2) Date: Feb. 27, 2023

(87) PCT Pub. No.: WO2022/043699
PCT Pub. Date: Mar. 3, 2022

(65) Prior Publication Data
US 2024/0021007 A1    Jan. 18, 2024

(30) Foreign Application Priority Data

Aug. 28, 2020  (GB) ...................................... 2013600
Sep. 3, 2020  (GB) ...................................... 2013864

(51) Int. Cl.
*G06V 40/13*    (2022.01)
(52) U.S. Cl.
CPC ................................. *G06V 40/1306* (2022.01)
(58) Field of Classification Search
CPC ........................ G06V 40/1306; G06V 40/1376
See application file for complete search history.

(56) References Cited

U.S. PATENT DOCUMENTS

2002/0017136 A1  2/2002  Morimura et al.
2004/0080882 A1*  4/2004  Miyazawa ......... G06V 40/1306
361/56

(Continued)

FOREIGN PATENT DOCUMENTS

GB    2585420    1/2021

OTHER PUBLICATIONS

Search Report & Written Opinion issued in Appl. No. PCT/GB2021/052226 (dated 2022).

(Continued)

*Primary Examiner* — Antonio Xavier
(74) *Attorney, Agent, or Firm* — Barnes & Thornburg LLP

(57) ABSTRACT

A biometric skin contact sensor comprising an array of sensor pixels, wherein each sensor pixel comprises: a capacitive sensing electrode for accumulating a charge in response to proximity of a conductive object to be sensed; a reference capacitor connected to the capacitive sensing electrode; a sense voltage-controlled impedance, VCI, having a control terminal connected to a connection between the capacitive sensing electrode and the reference capacitor, the sense VCI having an impedance controlled by its control terminal voltage, and wherein the pixel is arranged so that, in response to a select voltage being applied to the pixel, the control terminal voltage of the sense VCI indicates the proximity of the conductive object to be sensed; and biasing circuitry comprising a one-way conduction path from a bias voltage connection to the control terminal of the sense VCI so that current flows from the bias voltage towards the control terminal of the sense VCI in response to the control terminal voltage of the sense VCI dropping below a floor value.

20 Claims, 1 Drawing Sheet

(56) References Cited

U.S. PATENT DOCUMENTS

| | | |
|---|---|---|
| 2006/0097735 A1 | 5/2006 | Ebihara |
| 2014/0266262 A1 | 9/2014 | Taghibakhsh |
| 2017/0162121 A1* | 6/2017 | Yang .................. G06F 3/007 |
| 2018/0173919 A1 | 6/2018 | Lin et al. |

OTHER PUBLICATIONS

Search Report issued in Appl. No. GB2013864.0 (dated Feb. 19, 2021).

\* cited by examiner

BIOMETRIC SKIN CONTACT SENSOR AND METHOD OF OPERATING A BIOMETRIC SKIN CONTACT SENSOR

This application is a US national stage application under Section 371 of PCT Application No. PCT/GB2021/052226, filed on Aug. 27, 2021, which claims priority from United Kingdom Application Numbers 2013600.8, filed Aug. 28, 2020, and 2013864.0, filed Sep. 3, 2020, the entirety of each are hereby fully incorporated by reference herein.

TECHNICAL FIELD

The present disclosure relates to the field of biometric skin contact sensors, and more particularly to touch sensitive surfaces, and methods for control and signal acquisition from such surfaces.

Background

Secure, verifiable authentication, of user identity is an increasingly important part of all technology. To give just a few examples, it plays a part in:
  User equipment (UE) for communication and consumer access to media content;
  Computer devices and systems which store and provide access to sensitive data;
  Devices and systems for financial transactions or access control to buildings; and
  Access control for vehicles.

Biometric measurement of the user is now prevalent in all of these contexts and others. Biometric measures such as iris scanning, and facial recognition are dependent on lighting and field of view of a camera. It may also be possible to circumvent such security measures by presenting a video or photo of the user to the camera.

Fingerprint sensors have been thought of as being more secure, but it is possible also to overcome the security they provide, and the manufacturing requirements of such sensors makes it difficult to integrate them into other electronic devices such as mobile telephones and other UEs. In particular, fingerprint sensing demands very high resolution— at least hundreds of pixels per inch.

One example of such a sensor is Apple Inc's Touch ID (RTM). This sensor is based on a laser-cut sapphire crystal. It uses a detection ring around the sensor to detect the presence of the user's finger. The Touch ID (RTM) sensor uses capacitive touch sensing to detect the fingerprint, and has a 500 pixel per inch (PPI) resolution.

Capacitance sensors such as these use capacitive effects associated with the surface contours of the fingerprint. The sensor array pixels each include an electrode which acts as one plate of a capacitor, the dermal layer (which is electrically conductive) acts as the other plate, and the non-conductive epidermal layer acts as a dielectric. The capacitance is greater where the dermis is closer to the pixel electrode, and so the surface contours of the skin can be sensed by measuring the capacitance of each pixel (e.g. based on the charge accumulated on the pixel electrode) and assembling an image from those pixels.

Both passive matrix and active matrix capacitive touch sensors have been proposed. Most so-called passive capacitive touch sensing systems use an external driving circuit (such as an integrated circuit, IC) to drive a matrix of passive electrodes, and a separate readout circuit (e.g. an IC) to readout charge stored on these electrodes during the drive cycle. The stored charge varies dependent on the tiny capacitance changes due to touch events. Passive electrode systems are sensitive to environmental noise and interference.

Active matrix capacitive touch sensors include a switching element in each pixel. The switching element may control a conduction path between the capacitive sensing electrode in the pixel, and an input channel to an analogue to digital converter (ADC) in a read-out circuit. Typically each column of pixels in an active array is connected to one such input channel. The charge stored in the array can thus be read from the active matrix by controlling the switching elements to connect each row of pixels, one-by-one, to the ADC.

Each pixel needs to be connected to the read-out circuit, and all of the pixels of each column are effectively connected in parallel. The parasitic capacitance associated with each pixel therefore combines additively. This places an inherent limit on the number of pixels that can be combined together in any one column. This in turn limits the size and/or resolution of a capacitive touch sensor.

There thus remains a significant unmet commercial need for large area high resolution touch sensors.

SUMMARY

Aspects of the disclosure are set out in the independent claims and optional features are set out in the dependent claims. Aspects of the disclosure may be provided in conjunction with each other, and features of one aspect may be applied to other aspects.

In an aspect, there is provided a biometric skin contact sensor comprising an array of sensor pixels. Each sensor pixel comprises: a capacitive sensing electrode for accumulating a charge in response to proximity of a conductive object to be sensed; a reference capacitor connected to the capacitive sensing electrode; a sense voltage-controlled impedance, VCI, having a control terminal connected to a connection between the capacitive sensing electrode and the reference capacitor, the sense VCI having an impedance controlled by its control terminal voltage, and wherein the pixel is arranged so that, in response to a select voltage being applied to the pixel, the control terminal voltage of the sense VCI indicates the proximity of the conductive object to be sensed; and biasing circuitry comprising a one-way conduction path from a bias voltage connection to the control terminal of the sense VCI so that current flows from the bias voltage towards the control terminal of the sense VCI in response to the control terminal voltage of the sense VCI dropping below a floor value.

Embodiments may enable a control terminal of the sense VCI to be held at a selected voltage immediately prior to a sensor measurement being obtained. This may enable greater accuracy in sensor measurements, as such sensor measurements will be sensitive to variations in the control terminal voltage. Therefore, by holding the control terminal voltage to a known value this may improve accuracy and reliability, as differences in measurement values will be more likely to have been brought about by different capacitance measurements from the capacitive sensing electrode, rather than by virtue of control terminal voltage variations prior to obtaining a measurement. Biasing circuitry may enable the sense VCI control terminal voltage to remain at a constant value (e.g. the floor value), thereby facilitating greater accuracy. Also, the one-way conduction path may inhibit any flow of current away from the control terminal of the sense VCI.

Providing a floor value to the control terminal voltage may comprise providing a connection between the bias voltage and the control terminal so that current may flow toward the control terminal in the event that the control terminal voltage is below the floor value. The bias voltage may be continuously connected to the pixel, so that whenever the control terminal voltage drops, the bias voltage is provided thereon. The pixel may be arranged so that, in the event that the control terminal voltage is at or greater than the floor voltage, no current flows through the one-way conduction path. For example, current may only be provided from the bias voltage to the control terminal in the event that the control terminal voltage is below the floor voltage. The one-way conduction path may be arranged so that current may flow from the bias voltage towards the control terminal of the sense VCI, but never back from the sense VCI to the control terminal. The floor voltage for the control terminal of the sense VCI may correspond to the bias voltage. For example, the floor voltage may be equal to the bias voltage minus the expected voltage drop that would occur between the bias voltage and the control terminal of the sense VCI (e.g. by virtue of the biasing circuitry etc.).

The sensor may comprise reset circuitry selectively operable to reset the reference capacitor e.g. to set the reference capacitor to a selected voltage and/or charge. The reset circuitry may be configured to provide a connection to the reference capacitor so as to provide a known charge (e.g. the reset charge) on the capacitor. For example, the reset circuitry may be arranged to short the reference capacitor (e.g. to connect the first and second plate of the reference capacitor). Shorting the reference capacitor may reset the reference capacitor to a voltage of zero. The reset circuitry may be configured to reset the reference capacitor in response to a reset signal being applied thereto.

The reset circuitry may comprise a switch operable to short the reference capacitor. For example, the switch may comprise a reset VCI arranged to provide the reset charge on the reference capacitor in response to a reset voltage being applied to a control terminal of the reset VCI. A conductive path of the reset VCI may be arranged to provide a connection between the second plate of the reference capacitor and the first plate of the reference capacitor. The sensor may be configured to apply the reset voltage to the control terminal of the reset VCI before applying the select voltage to the pixel. The sensor may be configured to wait a selected time period after applying the reset voltage to the control terminal of the reset VCI before applying the select voltage to the pixel. The selected time period may be selected to enable the biasing circuitry to charge the control terminal of the sense VCI to the floor value. For example, the sensor may comprise a controller configured to apply a first gate drive signal (reset voltage) to the pixel to cause the reset circuitry to provide the reset charge on the capacitor (e.g. by discharging to zero voltage), and to then stop the first gate drive signal, to wait the selected time period (e.g. to enable the sense VCI control terminal to charge up to the floor voltage), and to then apply a second gate drive signal (select voltage) to the pixel to obtain a measurement.

The biasing circuitry may have an input connected to the bias voltage and an output connected to enable current to flow from the biasing circuitry to the control terminal of the sense VCI. The biasing circuitry may comprise a bias VCI. A conduction path of the bias VCI may separate the input from the output. The output of the biasing circuitry may be connected to the second plate of the reference capacitor and the reset circuitry. Both the input of the biasing circuitry and a control terminal of the bias VCI may be connected to the bias voltage (e.g. the biasing circuitry may be a transistor in a diode configuration, e.g. a diode-shorted transistor). The sensor may be arranged to control the bias voltage to provide a selected sensitivity for the sensor. For a measurement to be obtained from a pixel, the sensor may be configured to apply the select voltage from the gate drive channel to the first plate of the reference capacitor.

A conduction path of the sense VCI may connect a supply voltage to an input of a readout circuit. The sensor may comprise a select VCI having a conduction path connected in series between the conduction path of the sense VCI and the supply voltage. A control terminal of the select VCI may be arranged to receive the select voltage from the gate drive channel for that pixel. The control terminal of the reset VCI may be connected to another pixel or gate drive channel of the sensor to receive the reset voltage therefrom. For example, the control terminal of the reset VCI may be connected to an adjacent gate-drive channel of the array, such as the preceding gate drive channel in order of actuation (e.g. gate-drive channel N−1, where the pixel is connected to gate-drive channel N). The biasing circuitry may comprise a field effect transistor with a shorted gate and drain region connected to the bias voltage.

The biasing circuitry may be operable to provide a floor value for the control terminal voltage of the sense VCI. For example, the biasing circuitry may be arranged to provide a one-way conduction path from a bias voltage to the control terminal of the sense VCI to enable current to flow from the bias voltage to the control terminal of the sense VCI while the control terminal voltage is less than the floor voltage. The biasing circuitry may be operable to enable current to flow from the bias voltage to the control terminal of the sense VCI as long as the floor voltage (e.g. the bias voltage minus any associated voltage drop between the bias voltage and the control terminal of the sense VCI) is greater than the control terminal voltage. The biasing circuitry is arranged to provide a one-way conduction path so that current cannot flow from the control terminal of the sense VCI to the bias voltage. That is, the biasing circuitry may enable current to only flow from the bias voltage towards the control terminal of the sense VCI, and to inhibit any flow of current in the opposite direction (e.g. from the control terminal of the sense VCI to the bias voltage). The biasing circuitry may be arranged so that current will only flow from the bias voltage to the control terminal of the sense VCI while the floor voltage is greater than the control terminal voltage of the sense VCI. The biasing circuitry may be arranged so that current may always flow from the bias voltage towards the control terminal of the sense VCI while the control terminal voltage of the sense VCI is below the floor voltage. For example, the bias voltage may be permanently on and connected to the control terminal of the sense VCI.

The sensor may comprise a plurality of gate drive channels and a plurality of read-out channels. Each gate drive channel may be arranged to provide a select voltage to one or more sensor pixels and each read-out channel may be arranged to receive a read-out current from one or more sensor pixels. Each read-out current from a sensor pixel may be indicative of the control terminal voltage of the sense VCI for that sensor pixel in response to the select voltage being applied to said sensor pixel. One or more (e.g. all) of the VCIs may comprise a field effect transistor. The control terminal of each said VCI may comprise a gate region of the transistor. Each said transistor may comprise a thin film transistor.

In an aspect, there is provided a method of operating a biometric skin contact sensor comprising an array of sensor pixels, wherein each sensor pixel comprises: (i) a capacitive sensing electrode for accumulating a charge in response to proximity of a conductive object to be sensed, (ii) a reference capacitor, and (iii) a sense voltage-controlled impedance, VCI, having a control terminal connected to a connection between the capacitive sensing electrode and the reference capacitor, and wherein the sense VCI is arranged to have an impedance controlled by its control terminal voltage. The method comprises: resetting a charge on the reference capacitor to a selected value; providing a connection between a bias voltage and the pixel so that a control terminal voltage of the sense VCI is pre-set to a floor value; applying a select voltage to the pixel after the control terminal voltage of the sense VCI has been set to the floor value, so that the control terminal voltage of the sense VCI indicates the proximity of the conductive object to be sensed.

Resetting a charge on the reference capacitor may comprise providing a connection between the second and first plate. For example, this may be by applying a reset voltage to a control terminal of a reset VCI, wherein the reset VCI has a conductive path between the second plate and the first plate. Applying the reset voltage may comprise applying a reset control signal from another gate drive channel of the array (e.g. gate-drive channel N−1). Providing the connection between the bias voltage and the pixel may occur, or continue to occur, after the charge on the reference capacitor is reset to a selected value (e.g. the bias voltage may be permanently connected to the pixel to provide current thereto in dependence on the control terminal voltage). The connection between the bias voltage and the pixel may be provided for at least a selected time period after the charge on the reference capacitor is reset to a selected value and before the select voltage is applied to the pixel. The selected time period may comprise a non-overlap time period. The non-overlap time period may comprise a time period during which no gate drive signal is applied to the pixel, such as a time period during which neither a reset voltage nor a select voltage is applied to the pixel (e.g. neither a Gate N or Gate N−1 pulse is being applied to the pixel).

Applying the select voltage to the pixel may comprise applying the select voltage to the reference capacitor. Applying the select voltage to the pixel may comprise controlling application of the select voltage to the pixel to provide a select current to a conduction path of the sense VCI. Applying the select voltage to the pixel may comprise applying the select voltage to a control terminal of a select VCI. A conduction path of the select VCI may be connected in series between a supply voltage and the conduction path of the sense VCI. Applying the select voltage to the control terminal of the select VCI may act to open the conduction path of the select VCI to enable a flow of current from the supply voltage towards the sense VCI. Applying the bias voltage to the pixel may comprise providing a connection between the bias voltage and the capacitive sensing electrode, the control terminal of the sense VCI and the reset VCI. Applying the bias voltage to the pixel may comprise providing the bias voltage to both an input of a bias VCI and a control terminal of the bias VCI, wherein an output of said bias VCI of the pixel is connected to the connection between the capacitive sensing electrode and the reference capacitor. Applying the select voltage to the reference capacitor may comprise applying the select voltage to the first plate of the reference capacitor. The select voltage may be applied to the pixel (e.g. to the first plate of the reference capacitor) after the bias voltage has been applied to the pixel and the control terminal voltage of the sense VCI has been set to the floor value.

In an aspect, there is provided a biometric skin contact sensor comprising an array of sensor pixels. Each sensor pixel comprises: a capacitive sensing electrode and a reference capacitor connected to the capacitive sensing electrode; a sense voltage-controlled impedance, VCI, for providing a sensing output from the pixel and having a control terminal connected to a connection between the capacitive sensing electrode and the reference capacitor; biasing circuitry connected to the control terminal of the sense VCI operable to charge the control terminal of the sense VCI to a bias voltage; and reset circuitry operable selectively to provide a known reset charge on the reference capacitor. The sensor is configured to operate the reset circuitry to provide the reset voltage on the reference capacitor prior to operating the biasing circuitry to set (e.g. charge) the control terminal of the sense VCI to a bias voltage.

In an aspect, there is provided a biometric skin contact sensor comprising an array of sensor pixels. Each sensor pixel comprises: a capacitive sensing electrode and a reference capacitor connected to the capacitive sensing electrode; a sense voltage-controlled impedance, VCI, for providing a sensing output from the pixel and having a control terminal connected to a connection between the capacitive sensing electrode and the reference capacitor; biasing circuitry connected to the control terminal of the sense VCI comprising a one way conduction path between the control terminal of the sense VCI and a bias voltage; and reset circuitry operable selectively to provide a known voltage on the reference capacitor. The sensor is configured to operate the reset circuitry to provide the reset charge on the reference capacitor while the biasing circuitry continues to provide a one way conduction path between the control terminal of the sense VCI and the bias voltage. For example, the sensor may be configured to control operation to provide a delay between a falling edge of a gate line signal used for resetting the pixel and a rising edge of a gate line signal used for obtaining a measurement from the pixel. The delay may be selected to allow voltage of the control terminal to stabilise prior to operation of the pixel.

In an aspect, there is provided a biometric skin contact sensor comprising an array of sensor pixels. Each sensor pixel comprises: a capacitive sensing electrode for accumulating a charge in response to proximity of a conductive object to be sensed; a reference capacitor connected to the capacitive sensing electrode; a sense voltage-controlled impedance, VCI, having a control terminal connected to a connection between the capacitive sensing electrode and the reference capacitor, the sense VCI having an impedance controlled by its control terminal voltage, and wherein the pixel is arranged so that, in response to a select voltage being applied to the pixel, the control terminal voltage of the sense VCI indicates the proximity of the conductive object to be sensed; and biasing circuitry comprising a one-way conduction path from the control terminal of the sense VCI to a bias voltage connection so that current flows from the control terminal of the sense VCI towards the bias voltage in response to the control terminal voltage of the sense VCI increasing to above a ceiling value.

Such a sensor may be arranged substantially the same as sensors described herein. The difference being that the sense VCI may be arranged to open its conduction path in response to a control terminal voltage dropping below a selected value. For example, the sense VCI may be have a negative switch-on voltage, such as might be provided in a PMOS type transistor. In such examples, the biasing circuitry may be arranged to inhibit voltage at the control terminal getting too high (e.g. less negative). The biasing circuitry may be arranged to provide a ceiling value to the control terminal voltage such that, at a voltage value above the ceiling value, current flows from the control terminal of the sense VCI to the bias voltage, thereby to ensure the control terminal voltage remains at or below the ceiling voltage.

Aspects of the present disclosure may provide one or more computer program products comprising computer program instructions configured to program a processor to perform any of the methods disclosed herein.

FIGURES

Some examples of the present disclosure will now be described, by way of example only, with reference to the figures, in which.

In the drawings like reference numerals are used to indicate like elements.

SPECIFIC DESCRIPTION

Embodiments of the present disclosure relate to an active pixel design including a reference capacitor, a capacitive sensing electrode and a sense voltage-controlled impedance ('VCI'). Embodiments include circuitry to prepare the pixel prior to the pixel being used to obtain a measurement. The circuitry is arranged to enable the reference capacitor to be set to a known reference voltage prior to a measurement being made, as well as to enable a control terminal of the sense VCI to be set to a known voltage. The circuitry of the sensor enables these two events to occur separately, so that the capacitor may be set to a known charge, then the sense VCI control terminal can be set to a known voltage. Embodiments relate to a sensor including a sensor array having a plurality of such pixels.

An example of an active pixel design will now be described with reference to FIG. 1.

Figure 1:
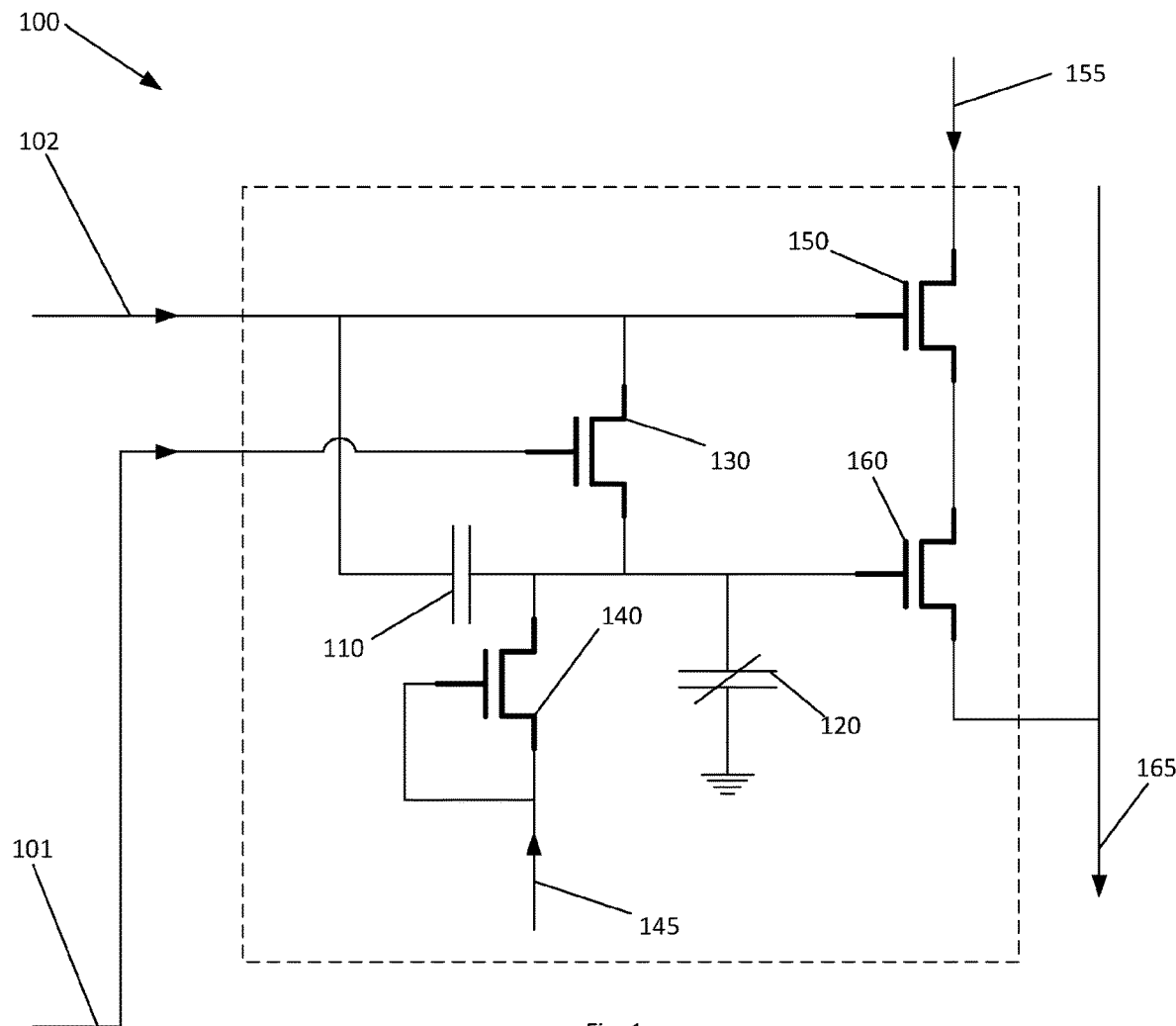
FIG. 1 is a schematic diagram of an exemplary pixel design.

FIG. 1 shows a sensor pixel 100. The pixel 100 includes a reference capacitor 110, a capacitive sensing electrode 120 and a sense voltage-controlled impedance ('VCI') 160. The pixel 100 also includes a reset VCI 130, a bias VCI 140, and a select VCI 150. Typically, such a pixel is deployed in an array (also called an active matrix) having a plurality of rows of such pixels. The pixel illustrated in FIG. 1 is in the Nth row of such an array. Also shown in FIG. 1 are connections to an $N^{th}$ gate drive channel 102 which provides gate drive signals to the other pixels in the $N^{th}$ row, and an $N-1^{th}$ gate drive channel 101 which provides gate drive signals to the pixels in another row of pixels (e.g. the $N-1^{th}$ row of pixels). Also illustrated in FIG. 1 is a connection to a bias voltage 145, a supply voltage 155 and a read-out channel 165.

As shown in FIG. 1, each of the VCIs is provided by a field effect transistor, such as a thin film transistor ('TFT'). Each VCI has a conduction channel the impedance of which is controlled by the voltage at a control terminal. The control terminal may be connected to a gate region of such a transistor, whereas the conduction channel may be provided between first and second main terminals of the VCI, connected to drain and source regions of the transistor respectively. The $N^{th}$ gate drive channel 102 is connected to a first plate of the reference capacitor 110. The $N^{th}$ gate drive channel 102 is also connected to the gate region of the select VCI 150. The $N-1^{th}$ gate drive channel 101 is connected to the gate region of the reset VCI 130. The reference capacitor 110 is connected to the gate region of the sense VCI 160. The second plate of the reference capacitor 110 is connected to the connection between the capacitive sensing electrode 120 and the gate region of the sense VCI 160.

The bias VCI 140 is diode-coupled to provide a one-way conduction path from the bias voltage connection 145 to the second plate of the reference capacitor 110. This also provides a one-way conduction path from the bias voltage connection 145 to the connection between the capacitive sensing electrode and the control terminal of the sense VCI.

A first main terminal of the reset VCI 130 is also connected to the second plate of the reference capacitor 110, and so also to the connection between the capacitive sensing electrode 120 and the gate region of the sense VCI 160.

The second main terminal of the reset VCI 130 is connected to the first plate of the reference capacitor 110. The conduction channel of the reset VCI 130 thus provides a selectively operable conduction path for discharging the reference capacitor 110. The first plate of the reference capacitor 110 is also connected to the $N^{th}$ gate drive channel 102.

The conduction channel of the select VCI 150 connects the conduction channel of the sense VCI 160 to the connection of the supply voltage 155 (e.g. the voltage source for the column of pixels which enables the sense VCI 160 to provide an output current to the read-out channel 165). The conduction channel of the sense VCI 160 connects the supply voltage 155 to the column output (read-out channel 165) for the pixel 100.

In operation the pixel 100 sequentially receives two different gate drive signals. The pixel 100 is arranged so that when receiving the first of these gate drive signals (from the $N-1^{th}$ gate-drive channel 101) this acts to prepare the pixel 100 for a measurement to be taken. The pixel 100 is arranged so that when receiving the second of these gate drive signals (from the $N^{th}$ gate-drive channel 102) this acts to enable a measurement to be obtained. Pixels may be arranged in an array (e.g. in rows and columns). The $N^{th}$ gate-drive signal corresponds to the gate drive signal for that row of pixels, whereas the $N-1^{th}$ gate-drive signal corresponds to the gate drive signal for the preceding row of pixels (e.g. the row of pixels which is activated prior to activation of pixels in the $N^{th}$ row).

The capacitive sensing electrode 120 is configured to accumulate a charge in response to proximity of the surface of a conductive object to be sensed. The capacitance sensing electrode 120 is arranged so that its capacitance depends on the proximity, to the capacitive sensing electrode 120, of a conductive surface of an object to be sensed. For example, when a select voltage is applied to the first plate of the reference capacitor 110, the relative division of that voltage between that capacitive sensing electrode 120 and the reference capacitor 110 provides an indication of the proximity of the surface of that conductive object to the capacitive sensing electrode 120. This division of the select voltage provides an indicator voltage at the connection between the reference capacitor 110 and the capacitive sensing electrode 120. The pixel 100 is arranged to apply this indicator voltage to the control terminal of the sense VCI 160 to provide an output from the pixel 100 which indicates proximity of the conductive object.

The select VCI 150 is arranged to control current flow to the sense VCI 160. The select VCI 150 may act as a switch to control whether a current input is provided to the sense VCI 160 or not (e.g. to control whether or not the sense VCI 160 can provide a current output to the read-out channel 165). The select VCI 150 is connected to the supply voltage 155, and the select VCI 150 is arranged to control current flow from the supply voltage 155 to the sense VCI 160. In particular, the conduction channel of the select VCI 150 connects the conduction channel of the sense VCI 160 to a reference signal source (which provides a voltage $V_{supply}$). The conduction channel of the sense VCI 160 is connected in series between the conduction channel of the select VCI 150 and the input of the read-out circuit for the column. The select VCI 150 is arranged to act as a switch that, when open, connects the sense VCI 160 between $V_{supply}$ (the reference signal source) and the input of the read-out circuit and, when closed, disconnects the sense VCI 160 from the reference signal source.

The select VCI 150 is therefore operable to inhibit the provision of signal from any inactive pixel (e.g. a pixel from which it is not intended to take a measurement at that point in time) to the input of the read-out circuit. This can help to ensure that signal is only received from active pixels (e.g. pixels from which a measurement is to be taken at that point in time). For example, the active pixels will be those in the row to which the gate drive pulse (select voltage) is being applied. Inactive pixels will be those in other rows, such as those in a row to which the reset voltage is to be applied (e.g. the inactive pixels may still be discharging the reference capacitor 110 and/or charging the control terminal of the sense VCI 160 at that time, but they are not being operated to obtain any measurement data at that time). The gate drive channel for the pixel row (the $N^{th}$ gate-drive channel 102) is connected to the first plate of the reference capacitor 110, and to the control terminal of a select VCI 150. The connection to the reference capacitor 110 and capacitive sensing electrode 120 means that the gate drive voltage is divided between the reference capacitor 110 and the capacitive sensing electrode 120 to provide the indicator voltage which controls the sense VCI 160. The connection of the $N^{th}$ gate-drive channel 102 to the control terminal of the select VCI 150 however means that, when the pixel 100 is not active, the conduction path of the sense VCI 160 is disconnected from the reference signal source.

The sense VCI 160 is arranged to control its output current (e.g. the current provided to the read-out channel 165) based on its control terminal voltage. The pixel 100 is arranged so that the control terminal voltage of the sense VCI 160 provides an indication of the proximity to the capacitive sensing electrode 120 of a conductive object to be sensed. The output current from the sense VCI 160 thus provides an indication of this proximity. The arrangement of the select VCI 150 and the sense VCI 160 is configured to inhibit output from the sense VCI 160 unless the gate drive pulse for that pixel row has been applied (e.g. the pixel 100 has received the $N^{th}$ gate-drive pulse). The conduction path of the sense VCI 160 may thus selectively connect the $N^{th}$ gate drive channel 102 to an output (read-out channel 165) of the pixel 100. The control terminal of the sense VCI 160 is connected to the capacitive sensing electrode 120 and to the second plate of the reference capacitor 110. Thus, in response to a control voltage applied by the gate drive channel, the reference capacitor 110 and the capacitive sensing electrode 120 act as a capacitive voltage divider.

The reset VCI 130 is arranged so that its conductive path enables the first plate of the reference capacitor 110 to be connected to the second plate of the reference capacitor 110 (e.g. to short the capacitor 110). The reset VCI 130 is configured so that said conductive path is selectively opened in dependence on a voltage applied to the gate region of the reset VCI 130. In the event that sufficient voltage is applied to the gate region of the reset VCI 130 (e.g. the N–$1^{th}$ gate-drive signal is applied to the gate region), the conductive path will open. The pixel 100 is arranged so that, when the conductive path is open, the reference capacitor 110 will be shorted. That is, the two plates of the reference capacitor 110 will be connected. Voltage on the reference capacitor 110 will tend to a reference value (e.g. it will discharge). In the event that insufficient voltage is applied to the gate region of the reset VCI 130 (e.g. when the Gate N–1 signal is stopped), the conductive path of said reset VCI 130 will effectively be closed.

The bias VCI 140 is arranged to provide biasing circuitry configured to provide a one-way conductive path from the bias voltage 145, $V_{bias}$. A control terminal and an input (e.g. gate and drain region) of the bias VCI 140 receives the bias voltage 145. The bias VCI is arranged to enable current to flow from the input side of the biasing circuitry through the bias VCI 140 to the output side as long as the floor voltage (e.g. the bias voltage minus any voltage drop across the bias VCI, such as a diode voltage drop) remains greater than the control terminal voltage for the sense VCI 160. The biasing circuitry is arranged so that current can only flow from the bias voltage 145 towards the control terminal of the sense VCI 160, and not the other way. Thus, once the input and output potential correspond to one another (e.g. once the gate region of the sense VCI 160 has been charged to the floor voltage—i.e. a value corresponding to $V_{bias}$), current will no longer flow through the biasing circuitry (towards the gate region of the sense VCI 160). In operation, the control terminal of the sense VCI 160 will be charged to a value corresponding to $V_{bias}$, and the reference capacitor 110 will be at a set voltage (e.g. discharged, so no voltage) prior to a measurement being obtained. The bias VCI 140 is arranged to inhibit flow of current towards $V_{bias}$ e.g. flow of current from the output of the bias VCI 140 to the input of the bias VCI 140. This may prevent any leakage of current that could provide a drop in the control terminal voltage of the sense VCI 160.

The sensor may be arranged to provide a separate voltage source to provide V bias, or this may be provided by operating voltage from elsewhere in the sensor (e.g. used for activating other components of the sensor). For example, the sensor may comprise a voltage provider for providing the bias voltage 145 to each pixel 100, or alternatively, the bias voltage may be generated from one or more other voltages present in the sensor. Voltage source circuitry may be provided to provide $V_{bias}$. The pixel 100 may be arranged so that $V_{bias}$ is a controllable voltage. This controllable voltage may be adjusted by the sensor to adjust and fix an initialisation voltage for the control terminal of the sense VCI 160. The initialisation voltage for the control terminal of the sense VCI 160 may comprise a value of this control terminal voltage to which this control terminal will be charged by the biasing circuitry (e.g. the floor voltage). The initialisation voltage can be set to a selected amount and controlled by controlling the bias voltage. The bias voltage 145 may be selected to tune the sensitivity of the pixel 100. For example, the output current of the sense VCI 160 typically has a characteristic dependence on the indicator voltage at the control terminal and its switch-on voltage. Thus, the bias voltage 145 may be chosen based on the switch-on voltage of the sense VCI 160. The characteristic may also comprise a linear region in which it may be preferable to operate.

The pixel 100 may thus be arranged to enable the reference capacitor 110 to be charged to a reference charge, and the control terminal of the sense VCI 160 to be pre-charged to a selected initialisation voltage whilst the pixel 100 is inactive (e.g. while another row of the array is being activated by the application of a gate pulse to another, different, row of the array). The reference charge and/or initialisation voltage may be known values. The pixel 100 is arranged so that the reference charge and/or initialisation voltage may remain at a constant value until the measurement is to be taken (e.g. until the $N^{th}$ gate-drive voltage is applied to the first plate of the reference capacitor 110 and the gate region of the select VCI 150).

The above description has related to an individual pixel 100. A capacitive biometric skin-contact sensor may be provided which includes an array of the sensor pixels as described herein. A sensor array comprises a plurality of such touch sensitive pixels. Typically, other than in respect of its position in the array, each pixel 100 is identical to the others in the array. The array will typically be a rectilinear grid, with the rows and columns evenly spaced. For example, the pixels may be square. The sensor array may have a pixel spacing of at least 200 dots per inch, dpi (78 dots per cm). The pixel spacing may be at least 300 dpi (118 dots per cm), for example at least 500 dpi (196 dots per cm).

Pixels may be positioned sufficiently close together so as to be able to resolve contours of the skin such as those associated with epidermal ridges, for example those present in a fingerprint, palmprint or other identifying surface of the body. It will be appreciated in the context of the present disclosure that contours of the skin may comprise ridges, and valleys between those ridges. During touch sensing, the ridges may be relatively closer to a sensing electrode 120 than the "valleys" between those ridges. Accordingly, the capacitance of a sensing electrode 120 adjacent a ridge will be higher than that of a sensing electrode 120 which is adjacent a valley. Systems disclosed herein provide sensors of sufficiently high resolution to perform fingerprint and other biometric touch sensing, and these may be provided over larger areas than has previously been possible.

In addition to the sensor array, a sensor may comprise a gate drive circuit, a read-out circuit, and a controller. The controller is configured to provide a clock signal, e.g. a periodic trigger, to the gate drive circuit, and to the read-out circuit.

The gate drive circuit comprises a plurality of gate drive channels, which it is operable to control separately, e.g. independently. Each such gate drive channel comprises a voltage source arranged to provide a select voltage output (e.g. to provide the select voltage applied to the pixels in the row corresponding to that gate drive channel). And each gate drive channel is connected to a corresponding row of pixels of the sensor array. Each gate drive channel is connected to the first plate of the reference capacitor 110 in each pixel 100 of its row of the sensor array. Each gate drivel channel may also be connected to the gate region of the select VCI 150 of each pixel 100 in its row of the sensor. Each gate drive channel may also be connected to the gate region of the reset VCI 130 of each pixel 100 in another row of pixels different to its own row of pixels (e.g. in the subsequent row of pixels).

The gate drive circuit is arranged to activate one of the gate drive channels during each clock cycle by applying a gate drive pulse to the pixels in the row to which that gate drive channel is connected (as well as to the pixels in the subsequent row). Thus, over a series of cycles, the channels (and hence the rows) are activated in sequence, and move from one step in this sequence to the next in response to the clock cycle from the controller. The gate drive channels may be connected to the gate region of the reset VCI 130 in the subsequent row of pixels so that, during one cycle (e.g. one application of a gate drive voltage to gate drive channel), a measurement may be obtained from the row of that gate drive channel and the pixels in the subsequent row may be prepared for a measurement to then be obtained therefrom.

The read-out circuit comprises a plurality of read-out channels. Each read-out channel is connected to a corresponding column of pixels in the sensor array. To provide these connections, the conduction path of the sense VCI 160 in each pixel 100 is connected to the read-out channel 165 for the column. The gate drive channel for the row is thus configured to provide a reference input, and the operation of the sense VCI 160 modulates this reference input to provide the pixel output. This output signal from a pixel 100 indicates the charge stored on the capacitive sensing electrode 120 in response to that reference input relative to that stored on the reference capacitor 110.

Each read-out channel 165 of the read-out circuit may comprise an analogue front end (AFE) and an analogue-to-digital converter (ADC) for obtaining a digital signal from the column connected to that input channel. For example, such processing circuitry for the read-out currents may be configured to integrate the current applied to the read-out channel 165 (the output signal from one or more pixels) during the gate pulse to provide a measure of the current passed through the sense VCI 160 of the active pixel 100 in that column. The read-out circuit may convert this signal to digital data using the ADC. Furthermore, the analogue front end may perform impedance matching, signal filtering and other signal conditioning and may also provide a virtual reference.

Each column of pixels may be virtually connected to a ground or reference voltage. As such there may be no voltage differences on each of the columns thereby minimising parasitic capacitance. Furthermore, reference signal sources disclosed herein may apply a current-drive rather than a voltage-drive which may further reduce any effect parasitic capacitance could have on the signal applied by the active pixels on the read-out channel 165 of the read-out circuit.

Such a sensor may also comprise a dielectric shield or a topcoating, and a connector for connection to a host device. The dielectric shield or topcoating may generally be in the form of a sheet of an insulating material which may be transparent and flexible such as a polymer or glass. The dielectric shield may be flexible, and/or may be curved. An 'active area' of this shield overlies the sensor array. The VCIs and other pixel components may be carried on a separate substrate, and the shield may overlie these components on their substrate. In other embodiments, the shield may provide the substrate for these components. The connector for connection to a host device may be provided by a multi-channel connector having a plurality of conductive lines. The connector may be flexible, and may comprise a connector such as a flexi, or flexi-rigid PCB, a ribbon cable or similar. The connector may carry a host interface, such as a plug or socket, for connecting the conductive lines in the connector to signal channels of a host device in which the sensor apparatus is to be included. A host interface may be connected by the connector to the read-out circuit. A controller may be connected to the gate drive circuit for operating the sensor array, and to the read-out circuit for obtaining signals indicative of the self-capacitance of pixels of the sensor array.

An operation of the sensor of FIG. 1 will now be described with reference to the timing diagram of FIG. 2.

Figure 2:
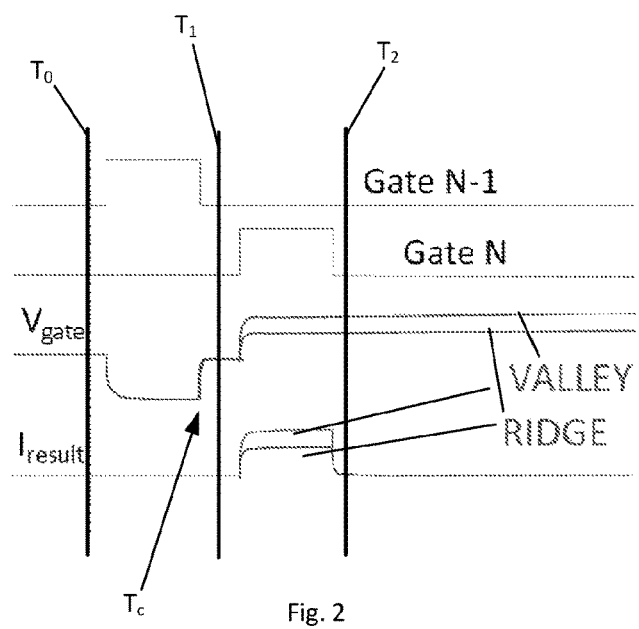
FIG. 2 is a timing diagram illustrating operation of a sensor.

FIG. 2 shows a timing diagram for operation of the sensor. The three vertical lines of FIG. 2 show an initial time $T_0$, a first time $T_1$ and a second time $T_2$. Also shown is a charging time period $T_c$. FIG. 2 shows how four separate signal values (e.g. parameters) vary over time. From the top downwards, the first value shows a gate-drive signal for the N-1$^{th}$ gate drive channel 101 (i.e. the gate drive channel for the row of pixels preceding the row in which the sensor pixel 100 is in which will provide the sensor measurement, the N$^{th}$ gate drive channel 102, as shown in FIG. 2). The second value shows a gate-drive signal for the N$^{th}$ gate drive channel 102. The third value shows the gate voltage $V_{gate}$ for the sense VCI 160. The fourth value shows the output current from the sense VCI 160 $I_{result}$, on the read-out channel 165.

On each cycle of operation, the gate-drive circuit and the read-out circuit receive clock signals from the controller. The gate-drive circuit will receive a clock signal for when to apply a gate-drive signal to a gate-drive channel (e.g. to apply the select voltage to the pixel), and when to stop applying the gate-drive voltage to a gate-drive channel.

In response to a first clock signal, the gate drive circuit operates one of the gate drive channels to apply a select voltage to one of the rows of the array (in this example, this is the N-1$^{th}$ gate drive channel 101). As described in more detail below with reference to the N$^{th}$ gate drive channel 102, the select voltage is applied to each pixel 100 in the N-1$^{th}$ gate drive channel 101. Additionally, the select voltage associated with the N-1$^{th}$ gate drive channel 101 is also applied as a reset voltage to each pixel 100 in the row connected to the N$^{th}$ gate drive channel 102. In particular, the select voltage from the N-1$^{th}$ channel 101 is applied as a reset voltage to the gate region of the reset VCI 130 in each of the pixels in the row connected to the N$^{th}$ gate drive channel 102 (which pixels are currently inactive—e.g. which pixels are not currently being operated to obtain measurement data therefrom).

In the N$^{th}$ (inactive row), the reset voltage is applied to the gate region of the reset VCI 130. This causes the conductive path of the reset VCI 130 to open, thereby to connect the second plate of the reference capacitor 110 to the first plate of the reference capacitor 110. This causes a discharge of the reference capacitor 110. As can be seen in FIG. 2, shortly after $T_0$, the Gate N-1 reset voltage is applied to the gate region of the reset VCI 130. This in turn causes the conductive path of the reset VCI 130 to open and the reference capacitor 110 to discharge, thereby causing $V_{gate}$ to drop (e.g. so that $V_{gate}$ is now negative). The Gate N-1 reset voltage is applied for a first time period (as shown in FIG. 2, this first time period occurs from $T_0$ to shortly before $T_1$). During this first time period, $V_{gate}$ initially drops, before levelling off to remain at a constant value. Also, during this first time period, $V_{bias}$ is applied to each of the pixels in the N$^{th}$ row.

After the first time period (shorty before $T_1$), the Gate N-1 signal is stopped, so that no reset signal is applied to the pixel 100 (e.g. no reset voltage is applied to the reset VCI 130). The conductive path of the reset VCI 130 is thus closed, and so the second plate of the reference capacitor 110 is no longer connected to the first plate of the reference capacitor 110. A charge of the reference capacitor 110 may thus remain constant at the value it was at prior to the first time period ending.

After the first time period ends, the charging time period occurs in which the control terminal of the sense VCI 160 is pre-charged to the initialisation voltage (e.g. the floor voltage). For example, a second clock signal may be applied to the gate drive circuitry to stop a gate drive pulse being applied to the N-1$^{th}$ gate drive channel 101. As shown in FIG. 2, the charging time period occurs before and after $T_1$. During the charging time period, no gate drive signal is applied to the N-1$^{th}$ gate drive channel 101, or the N$^{th}$ gate drive channel 102. During the charging time period, the bias voltage 145 is applied to the pixel 100. The bias voltage 145 is connected so that it may always be applied to the control terminal of the sense VCI 160 (e.g. so that, as long as the control terminal voltage of the sense VCI 160 is below the floor voltage, current will flow from the bias voltage 145 towards the sense VCI 160). The bias voltage 145 is applied along a one-way conduction path (bias VCI 140), so that the initialisation (e.g. floor) voltage will be provided for the pixel 100. That is, the bias voltage 145 will be applied to the pixel 100 until the gate voltage of the sense VCI 160 corresponds to the bias voltage 145. In other words, the bias voltage 145 will be applied until the gate voltage of the sense VCI 160 is at or above the floor voltage e.g. so that no voltage difference exists between the source of the bias voltage 145 and the gate region of the sense VCI 160 (allowing for any voltage drops between the two such as diode voltage drop). Once $V_{gate}$ corresponds to $V_{bias}$, no further current will flow through bias VCI 140 into the pixel 100, as $V_{gate}$ will have been charged up so that it corresponds to $V_{bias}$.

This is shown in FIG. 2. In the charging time period, $V_{bias}$ is applied to the pixel 100, and $V_{gate}$ increases to a selected value, at which point it plateaus and does not change. This selected value will correspond to $V_{bias}$. The charging time period is selected to be long enough to enable $V_{gate}$ to have enough time to this plateau at which point it corresponds to $V_{bias}$. As shown in FIG. 2, the charging time period continues from before $T_1$ to a short while after $T_1$. During the charging time period, the pixels of the N$^{th}$ row may be charged to a selected voltage, before they are next activated in a subsequent gate pulse (e.g. the Gate N pulse). This selected voltage may be selected to tune the sensitivity of the pixels. For example, the output current of the sense VCIs typically have a characteristic dependence on the indicator voltage at the control terminal and its switch on voltage. Thus, the selected voltage may be chosen based on the switch on voltage of the sense VCI 160. The selected voltage may be the same for all the sensor pixels in the array (e.g. to provide increased uniformity to sensor measurements). The characteristic may also comprise a linear region in which it may be preferable to operate.

The connection between the reset VCI 130 of a pixel 100, and the preceding pixel 100 enables the reference capacitor 110 of the pixel 100 to be discharged in this way by the gate pulse which activates the immediately preceding row (e.g. the reset voltage from the N-1$^{th}$ gate drive channel 101), which may be an adjacent row of the array. The connection between the bias voltage 145 and the gate region of the sense VCI 160 enables the gate region of the sense VCI 160 to be charged to a selected value prior to activation of that pixel 100.

A short time after $T_1$, a gate drive pulse is applied to the N$^{th}$ gate drive channel 102. For example, a third clock signal may be provided to the gate drive circuitry to cause a gate drive pulse to be applied to the N$^{th}$ gate drive channel 102. The N$^{th}$ gate drive pulse provides a select voltage to each pixel 100 in the N$^{th}$ row. For each said pixel 100, a select voltage is applied to the first plate of the reference capacitor 110 and also to the gate region of the select VCI 150. Application of the gate drive pulse to the select VCI 150 switches the select VCI 150 into a conducting state, thus opening the conduction path of the select VCI 150. The conductive path of the VCI then connects the conduction channel of the sense VCI 160 to the reference signal supply ($V_{supply}$).

The select voltage is also applied to the first plate of the reference capacitor 110. The relative division of voltage between the sensing electrode 120 and the reference capacitor 110 provides an indicator voltage at the connection between the reference capacitor 110 and the capacitive sensing electrode 120 as described above. The indicator voltage is applied to the control terminal of the sense VCI 160 to control the impedance of the conduction channel of the sense VCI 160. Thus, the sense VCI 160 connects the reference signal supply to the input channel of the read-out circuit for that column, and presents an impedance between the two which indicates the capacitance of the capacitive sensing electrode 120. Please note, the reference signal supply may be provided by a constant voltage supply.

A current is thus provided through the conduction path of the sense VCI 160 from the reference signal supply to the input channel of the read-out circuit for the pixel's column. This current is determined by the voltage of the reference signal supply and by the impedance of the conduction channel of the sense VCI 160 (and thus by the voltage in the gate region of the sense VCI 160). As can be seen in FIG. 2, shortly after $T_1$, when the Gate N pulse is applied, $V_{gate}$ also increases. In turn, this causes a current $I_{result}$ to be registered, wherein $I_{result}$ is indicative of the proximity to the capacitive sensing electrode 120 of the conductive object to be sensed.

In response to the same clock signal from the controller (e.g. the third clock signal), the read-out circuit senses the pixel output signal at each input channel (e.g. by integrating the current provided to each input channel), and digitizes this signal (e.g. using an ADC). The integration time of the read-out circuit may match the duration of the gate pulse. Thus, in each measurement cycle (e.g. from $T_1$ to $T_2$, and/or for each gate pulse), the read-out circuit obtains a set of digital signals, each signal corresponding to the signals sensed from each column of the active row during the gate pulse. The output from each pixel 100 in the row (each channel during that gate pulse) being indicative of the charge stored on the capacitive sensing electrode 120 in that pixel 100. So, the set of signals together represent the active row as a whole, and the output from each pixel 100 being indicative of the charge stored on and/or the self-capacitance of the capacitive sensing electrode 120 in that pixel 100.

At, or shortly before, $T_2$, the gate drive pulse (Gate N) finishes and the gate drive circuit ceases to apply a select voltage to the pixels in row N (and also a reset voltage to pixels in row N+1). The select voltage is no longer being applied to the control terminals of the select VCIs and as a result the select VCIs of row N turn off. The conduction paths through the select VCIs of the pixels in row N therefore close, so that there is no connection between $V_{supply}$ and the sense VCI 160. A signal is thus no longer applied by the pixel 100 to the input of the read-out circuit. It is to be appreciated in the context of the present disclosure that some residual charge on the sensing electrode 120 may remain after the gate pulse for line N has finished. It will be appreciated that the select VCI 150 may act to prevent such residual charge operating the sense VCI 160 and so giving rise to spurious signal from inactive rows.

Following this same process, each of the gate-drive channels is activated in sequence to prepare subsequent rows and then measure said rows. This drives the sense VCI 160 of each pixel 100 connected to that channel into a conducting state for a selected time (typically the duration of one gate pulse). By activating the rows of the array in sequence, the read-out circuit can scan the sensor array row-wise (e.g. row-by-row). Other pixel designs, other scan sequences, and other types of sensor array, may be used. For example, pixel rows need not be activated sequentially in order, and/or connections to other pixel rows such as to receive a reset voltage therefrom need not be connections to the immediately preceding row. For example, pixels may be connected to receive reset voltage from rows which are spaced apart by one or more intermediary rows. Pixel scans may operate an odd even basis. For example, connections may then be between even rows N−2 and N, N and N+2 and N+2 and N+4 with the corresponding odd rows N−1 and N+1, N+1 and N+3 etc.

At the boundaries of the pixel array, where an N−1 gate line is not available, a dummy signal may be used to provide the control signal to the reset VCI 130. The gate drive circuit may provide the dummy signal. This may be provided by a gate drive channel which is only connected to the reset VCIs of a row at the boundary of the array, but not to any sense or select VCIs.

When a conductive surface is in sufficient proximity to the capacitive sensing electrode 120 of a pixel 100 in row N, an indicator voltage, dependent on the relative division of voltage between the sensing electrode 120 and the reference capacitor 110, is produced. The indicator voltage produced by the capacitive sensing electrode 120 and reference capacitor 110 is applied to the control terminal of the sense VCI 160. A conduction path is thereby opened between the reference signal supply and the read-out circuit. As a result, signals such as those shown by $I_{result}$ in FIG. 2 are applied to the corresponding input of the read-out circuit. The magnitude of the signal will depend on the proximity of the conductive surface.

It will be appreciated in the context of the present disclosure that contours of the skin may comprise ridges, and valleys between those ridges. During touch sensing, the "ridges" may be relatively closer to a sensing electrode 120 than the "valleys" between those ridges. Accordingly, the capacitance of a sensing electrode 120 adjacent a ridge will be higher than that of a sensing electrode 120 which is adjacent a valley.

The example shown in FIG. 2 overlays two signals ('valley' and 'ridge') generated by a conductive object positioned at two different distances from the capacitive sensing electrode 120 of a pixel 100. The two different positions of the conductive object result in two different capacitances of the sensing electrode 120 (e.g. because the dermis of the finger provides a second "plate" of a capacitor, the first "plate" of which is provided by the sensing electrode 120). The indicator voltages are applied to the control terminal of the sense VCI 160 of the pixel 100. Therefore, the impedance of the conduction path of the sense VCI 160 is different for the two positions of the conductive surface.

The signal applied to the input of the read-out circuit is dependent on the impedance of the sense VCI 160 and is therefore different for the conductive surface at two different distances from the capacitive sensing electrode 120. This is exemplified in the control terminal voltage signals $V_{gate}$ (valley and ridge) and read out signal profiles $I_{result}$ (valley and ridge). By obtaining signals across larger regions of the sensor array, a 'map' of such valleys and ridges may be obtained. This map may be used for biometric scanning (e.g. to compare obtained fingerprint data with known fingerprint data).

Embodiments described herein typically comprise one or more voltage-controlled impedance (VCI). Each such VCI has a control terminal, and a conduction path the impedance of which can be controlled by a voltage applied to its control terminal. Examples of voltage-controlled impedances include transistors such as thin film transistors (TFTs). It will also be appreciated that when implemented into the sensor as a means of achieving voltage controlled impedances thin film transistors would act as transconduction gates wherein the output current ($I_{drain-source}$) of the TFT would be dependent on the voltage across the gate and source ($V_{gate-source}$) of the TFT.

Dielectric shields disclosed herein may comprise a sheet or layer of insulating material such as glass or plastic. The insulating material of the dielectric shield described herein may be selected based on one or more of the following properties: surface roughness, transparency, chemical inertia, mechanical stiffness and robustness, dielectric constant; thermal behaviour, contact angle of the surface and ease of manufacture. Suitable glass substrates include but are not limited to: Soda lime, borosilicate and $SiO_2$. Suitable polymer substrates include but are not limited to Poly Imide (PI), Polyethylene terephthalate (PET), polyethylene naphthalate (PEN).

It will be appreciated in the context of the present disclosure that the sensor apparatus may be designed to match certain timings. The read-out of the pixel 100 array performed by the read-out circuit may be executed on a frame basis, wherein each row of the pixels is read-out sequentially using a dedicated row time. Such that within a row time, all the corresponding pixels of that row are read-out. For example, the gate drive pulses may be controlled to lie within said frame times and to provide sufficient time for discharging of the reference capacitor 110 and/or charging of the gate region of the sense VCI 160. Such read-outs may be similar to TFT display technology. However, the present case relates to pixel-reading of the sensor array rather than the pixel-writing of a TFT display.

The collection of all rows and related timing, may define the frame time of the sensor apparatus. For example, a row time of 25 μsec, with a total of 100 rows, would result in a frame time of 2.5 msec i.e. 25 μsec×100. Other timings and read-out sequences may also be appropriate. For example, in the case of multiplexer circuits, a multiple number of conversions may have to be executed within a single gate line time. It will be appreciated in the context of the present disclosure that timings may vary depending on requirements for the sensor measurement. Likewise, timings may be controlled to provide a selected time period between the falling edge of a first signal being applied (e.g. from the Gate N−1 gate drive channel to a pixel in the Gate N row) and the leading edge of a second signal being applied (e.g. from the Gate N gate drive channel to said pixel in the Gate N row). The selected time period may be more than 0.1 μsec, such as more than 0.5 μsec, more than 1 μsec, more than 2 μsec. For example, the selected time period may be considered to comprise two periods—one within each clock cycle, so that each clock cycle both starts and ends with a period where no signal is applied. The signals may be controlled to provide a selected ratio of on:off for application of the signal, such that a signal is applied to the pixels for at least half of the time between clock signals. As one example, a between each clock signal, there may first be 2 μsec of no signal being applied (to enable discharge of reference capacitor and pre-charging of control terminal voltage), followed by 6 μsec of signal being applied (for measurements to be taken), then a further 2 μsec of no signal. This is of course just one example of timings, others may be used.

It will be appreciated in the context of the present disclosure that where field effect transistors have been provided, other such suitable components could be used. For example, one or more switching elements could be provided which do not use FETs (such as for the select VCI 150). The bias VCI 140 may instead be replaced by a diode (e.g. rather than a diode connected FET) or two VCIs (e.g. TFTs) in series. Embodiments include use of select VCIs and reset VCIs, but it will be appreciated in the context of the present disclosure that these are not essential. For example, a sensor measurement could still be obtained without a sense VCI 160 and/or the sense VCI 160 could still be charged to a floor voltage without needing a sense VCI 160. Likewise, a reset VCI 130 may not be needed for the sense VCI 160 to be charged to the floor voltage. It will also be appreciated that where reference is made to $N^{th}$ and $N-1^{th}$ channels, these may be adjacent channels, or they may not. For example, a connection may be provided between non-adjacent channels to provide signals (e.g. reset voltages).

While the above discussion has related to a positive $V_{bias}$ voltage being used, and the control terminal voltage of the sense VCI being maintained at or above a floor voltage, it is to be appreciated that arrangements may be provided with inverted voltages. That is, the sense VCI may be actuated by a negative voltage. For example, low temperature polycrystalline silicon and/or organic PMOS may be used. In such cases, where the sense VCI is arranged for regulating its output current to a read-out channel based on a negative voltage at its control terminal, the biasing circuitry may also be configured to operate in reverse. That is, the one-way conduction path may be arranged to carry current away from the control terminal of the sense VCI to the bias voltage, thereby to maintain the control terminal voltage of the sense VCI at or below a selected voltage, e.g. the biasing circuitry is arranged to maintain a ceiling voltage for the control terminal voltage (rather than a floor voltage). It will be appreciated that in such examples, the biasing circuitry will be configured so that, if the control terminal voltage is at or above the ceiling voltage, the one-way conduction path will facilitate conduction away from the control terminal so that the control terminal voltage returns to the ceiling voltage. This conduction will only happen when the control terminal voltage is greater than the ceiling voltage. The one-way conduction path will otherwise not conduct, thereby to maintain the control terminal voltage at or below the ceiling voltage.

It will be appreciated from the discussion above that the examples shown in the figures are merely exemplary, and include features which may be generalised, removed or replaced as described herein and as set out in the claims. Processing functionality of devices or controllers described herein may also be provided by devices which are supported by an electronic device. It will be appreciated however that the functionality need not be divided in this way, and should not be taken to imply any particular structure of hardware other than that described and claimed below.

As will be appreciated by the skilled reader in the context of the present disclosure, each of the examples described herein may be implemented in a variety of different ways. Any feature of any aspects of the disclosure may be combined with any of the other aspects of the disclosure. For example, method aspects may be combined with apparatus aspects, and features described with reference to the operation of particular elements of apparatus may be provided in methods which do not use those particular types of apparatus. In addition, each of the features of each of the examples is intended to be separable from the features which it is described in combination with, unless it is expressly stated that some other feature is essential to its operation. Each of these separable features may of course be combined with any of the other features of the examples in which it is described, or with any of the other features or combination of features of any of the other examples described herein. Furthermore, equivalents and modifications not described above may also be employed without departing from the invention.

Certain features of the methods described herein may be implemented in hardware, and one or more functions of the apparatus may be implemented in method steps. It will also be appreciated in the context of the present disclosure that the methods described herein need not be performed in the order in which they are described, nor necessarily in the order in which they are depicted in the drawings. Accordingly, aspects of the disclosure which are described with reference to products or apparatus are also intended to be implemented as methods and vice versa. The methods described herein may be implemented in computer programs, or in hardware or in any combination thereof. Computer programs include software, middleware, firmware, and any combination thereof. Such programs may be provided as signals or network messages and may be recorded on computer readable media such as tangible computer readable media which may store the computer programs in non-transitory form. Hardware includes computers, handheld devices, programmable processors, general purpose processors, application specific integrated circuits (ASICs), field programmable gate arrays (FPGAs), and arrays of logic gates.

Other examples and variations of the disclosure will be apparent to the skilled addressee in the context of the present disclosure.

The invention claimed is:

1. A biometric skin contact sensor comprising an array of sensor pixels, wherein each sensor pixel comprises:
   a capacitive sensing electrode for accumulating a charge in response to proximity of a conductive object to be sensed;
   a reference capacitor connected to the capacitive sensing electrode;
   a sense voltage-controlled impedance, VCI, having a control terminal connected to a connection between the capacitive sensing electrode and the reference capacitor, the sense VCI having an impedance controlled by its control terminal voltage, and wherein the pixel is arranged so that, in response to a select voltage being applied to the pixel, the control terminal voltage of the sense VCI indicates the proximity of the conductive object to be sensed; and
   biasing circuitry comprising a one-way conduction path from a bias voltage connection to the control terminal of the sense VCI so that current flows from the bias voltage towards the control terminal of the sense VCI in response to the control terminal voltage of the sense VCI dropping below a floor value.

2. The sensor of claim 1, wherein the sensor comprises reset circuitry selectively operable to provide a reference voltage on the reference capacitor.

3. The sensor of claim 2, wherein the reset circuitry comprises a reset VCI arranged to provide a reference voltage on the reference capacitor in response to a reset signal being applied to a control terminal of the reset VCI.

4. The sensor of claim 3, wherein a conductive path of the reset VCI is arranged to provide a connection between a second plate of the reference capacitor and a first plate of the reference capacitor.

5. The sensor of claim 3, wherein the sensor is configured to apply the reset signal to the control terminal of the reset VCI before applying the select voltage to the pixel.

6. The sensor of claim 5, wherein the sensor is configured to wait a selected time period after applying the reset signal to the control terminal of the reset VCI before applying the select voltage to the pixel.

7. The sensor of claim 6, wherein the selected time period is selected to enable the biasing circuitry to charge the control terminal of the sense VCI to the floor value.

8. The sensor of claim 3, wherein the control terminal of the reset VCI is connected to another pixel or gate drive channel of the sensor to receive the reset voltage therefrom.

9. The sensor of claim 1, wherein the biasing circuitry has an input connected to the bias voltage and an output connected to enable current to flow from the biasing circuitry to the control terminal of the sense VCI; and
   wherein the biasing circuitry comprises a bias VCI, and wherein a conduction path of the bias VCI separates the input from the output.

10. The sensor of claim 1, wherein the sensor is arranged to control the bias voltage to provide a selected sensitivity for the sensor.

11. The sensor of claim 1, wherein the sensor is configured to apply the select voltage to a first plate of the reference capacitor.

12. The sensor of claim 1, wherein a conduction path of the sense VCI is operable to connect a supply voltage to an input of a readout circuit.

13. The sensor of claim 12, wherein the sensor comprises a select VCI having a conduction path connected in series between the conduction path of the sense VCI and the supply voltage thereby to selectively connect the sense VCI to the supply voltage.

14. A method of operating a biometric skin contact sensor comprising an array of sensor pixels, wherein each sensor pixel comprises: (i) a capacitive sensing electrode for accumulating a charge in response to proximity of a conductive object to be sensed, (ii) a reference capacitor, and (iii) a sense voltage-controlled impedance, VCI, having a control terminal connected to a connection node between the capacitive sensing electrode and the reference capacitor, and wherein the sense VCI is arranged to have an impedance controlled by its control terminal voltage, wherein the method comprises:
   resetting a charge on the reference capacitor to a selected value;
   providing a one way conduction path between a bias voltage and a control terminal of the sense VCI so that the control terminal voltage is at a floor value;
   applying a select voltage to the pixel after the control terminal voltage of the sense VCI has been set to the floor value, so that the control terminal voltage of the sense VCI indicates the proximity of the conductive object to be sensed.

15. The method of claim 14, wherein resetting a charge on the reference capacitor comprises providing a connection between a second and a first plate.

16. The method of claim 14, providing the connection between the bias voltage and the pixel occurs, or continues to occur, after the charge on the reference capacitor is reset to a selected value.

17. The method of claim 16, wherein the connection between the bias voltage and the pixel is provided for at least a selected time period after the charge on the reference capacitor is reset to a selected value and before the select voltage is applied to the pixel.

18. The method of claim 14, wherein applying the select voltage to the pixel comprises controlling application of the select voltage to the pixel to provide a select current to a conduction path of the sense VCI.

19. A non-transitory computer program product comprising computer program instructions configured to program a processor to perform the method of claim 14.

20. A biometric skin contact sensor comprising an array of sensor pixels, wherein each sensor pixel comprises:
- a capacitive sensing electrode for accumulating a charge in response to proximity of a conductive object to be sensed;
- a reference capacitor connected to the capacitive sensing electrode;
- a sense voltage-controlled impedance, VCI, having a control terminal connected to a connection between the capacitive sensing electrode and the reference capacitor, the sense VCI having an impedance controlled by its control terminal voltage, and wherein the pixel is arranged so that, in response to a select voltage being applied to the pixel, the control terminal voltage of the sense VCI indicates the proximity of the conductive object to be sensed; and
- biasing circuitry comprising a one-way conduction path from the control terminal of the sense VCI to a bias voltage connection so that current flows from the control terminal of the sense VCI towards the bias voltage in response to the control terminal voltage of the sense VCI increasing to above a ceiling value.

* * * * *